United States Patent
Ro et al.

(10) Patent No.: US 9,999,826 B2
(45) Date of Patent: Jun. 19, 2018

(54) VIRTUAL GOLF SIMULATION DEVICE AND METHOD FOR PROVIDING STEREOPHONIC SOUND FOR WEATHER

(71) Applicant: GOLFZON Co., Ltd., Daejeon (KR)

(72) Inventors: Young Wook Ro, Seoul (KR); Han Sup Kim, Seongnam-si (KR)

(73) Assignee: GOLFZON Co., Ltd., Daejon (KR)

( * ) Notice: Subject to any disclaimer, the term of this patent is extended or adjusted under 35 U.S.C. 154(b) by 41 days.

(21) Appl. No.: 15/109,132

(22) PCT Filed: Dec. 30, 2014

(86) PCT No.: PCT/KR2014/013079
§ 371 (c)(1),
(2) Date: Jun. 30, 2016

(87) PCT Pub. No.: WO2015/102392
PCT Pub. Date: Jul. 9, 2015

(65) Prior Publication Data
US 2016/0325170 A1 Nov. 10, 2016

(30) Foreign Application Priority Data
Dec. 30, 2013 (KR) .................. 10-2013-0167611

(51) Int. Cl.
*A63B 69/36* (2006.01)
*A63B 71/06* (2006.01)
*G09B 19/00* (2006.01)

(52) U.S. Cl.
CPC ...... *A63B 71/0622* (2013.01); *A63B 69/3623* (2013.01); *G09B 19/0038* (2013.01)

(58) Field of Classification Search
CPC ............ A63B 69/3623; A63B 71/0622; A63B 69/3691
See application file for complete search history.

(56) References Cited

U.S. PATENT DOCUMENTS

| | | | | | |
|---|---|---|---|---|---|
| 5,828,756 | A | * | 10/1998 | Benesty | ............... H04M 9/082 379/406.08 |
| 5,951,015 | A | * | 9/1999 | Smith | .................... A63B 63/00 273/358 |
| 6,347,999 | B1 | * | 2/2002 | Yuan | ...................... A63F 13/08 463/3 |

(Continued)

FOREIGN PATENT DOCUMENTS

KR  10-2009-0100917 A  9/2009
KR    10-0921668 B1   10/2009

(Continued)

OTHER PUBLICATIONS

International Search Report for PCT/KR2014/013079 dated Apr. 20, 2015 from Korean Intellectual Property Office.

*Primary Examiner* — Jason Skaarup
(74) *Attorney, Agent, or Firm* — Revolution IP, PLLC

(57) ABSTRACT

Disclosed herein are a virtual golf simulation device and method for providing stereophonic sound for weather conditions configured such that it is possible for a user to visually and aurally recognize a weather condition, such as wind, when the user plays a round of virtual golf on a virtual golf course using the virtual golf simulation device, and, in particular, the direction or intensity of the wind is expressed via multi-channel stereophonic sound, whereby it is possible to provide a high level of realism even without actually blowing air.

18 Claims, 10 Drawing Sheets

(56) References Cited

U.S. PATENT DOCUMENTS

| | | | | |
|---|---|---|---|---|
| 6,471,586 B1* | 10/2002 | Aiki | | A63F 13/08 434/61 |
| 2002/0002411 A1* | 1/2002 | Higurashi | | A63F 13/005 700/91 |
| 2004/0088120 A1* | 5/2004 | Kelly | | A63B 24/0021 702/41 |
| 2007/0243926 A1* | 10/2007 | Cheng | | A63F 7/06 463/23 |
| 2009/0191929 A1* | 7/2009 | Nicora | | A63B 69/36 463/3 |
| 2011/0111849 A1* | 5/2011 | Sprague | | G03B 21/14 463/31 |
| 2012/0277036 A1* | 11/2012 | Lee | | A63B 69/3623 473/409 |
| 2012/0289351 A1* | 11/2012 | Woo | | A63B 24/0003 473/156 |
| 2013/0142338 A1* | 6/2013 | Chang | | H04S 5/005 381/17 |
| 2013/0316839 A1* | 11/2013 | Woo | | A63B 67/02 473/156 |
| 2014/0013361 A1* | 1/2014 | Monari | | H04N 5/2252 725/62 |
| 2014/0199669 A1* | 7/2014 | Anderson | | G09B 19/00 434/219 |
| 2016/0023081 A1* | 1/2016 | Popa-Simil | | A63B 69/16 700/91 |
| 2017/0277260 A1* | 9/2017 | Tamaoki | | G02B 27/0093 |

FOREIGN PATENT DOCUMENTS

| | | |
|---|---|---|
| KR | 10-0972825 B1 | 7/2010 |
| KR | 10-2011-0047909 A | 5/2011 |
| KR | 10-2011-0088670 A | 8/2011 |
| KR | 10-1257773 B1 | 4/2013 |

* cited by examiner

[Fig. 1]
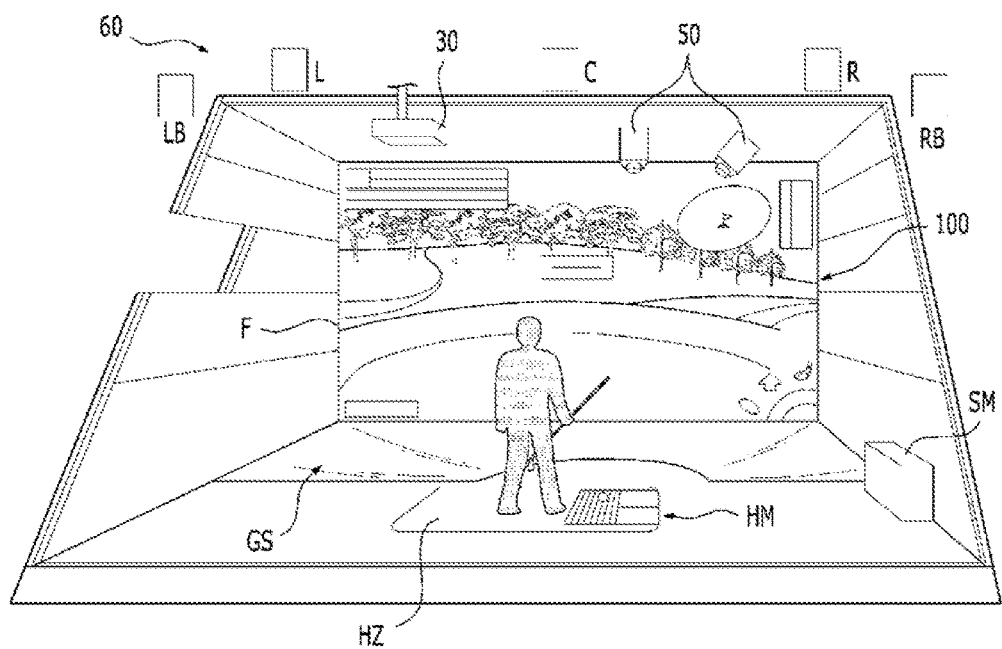

[Fig. 2]
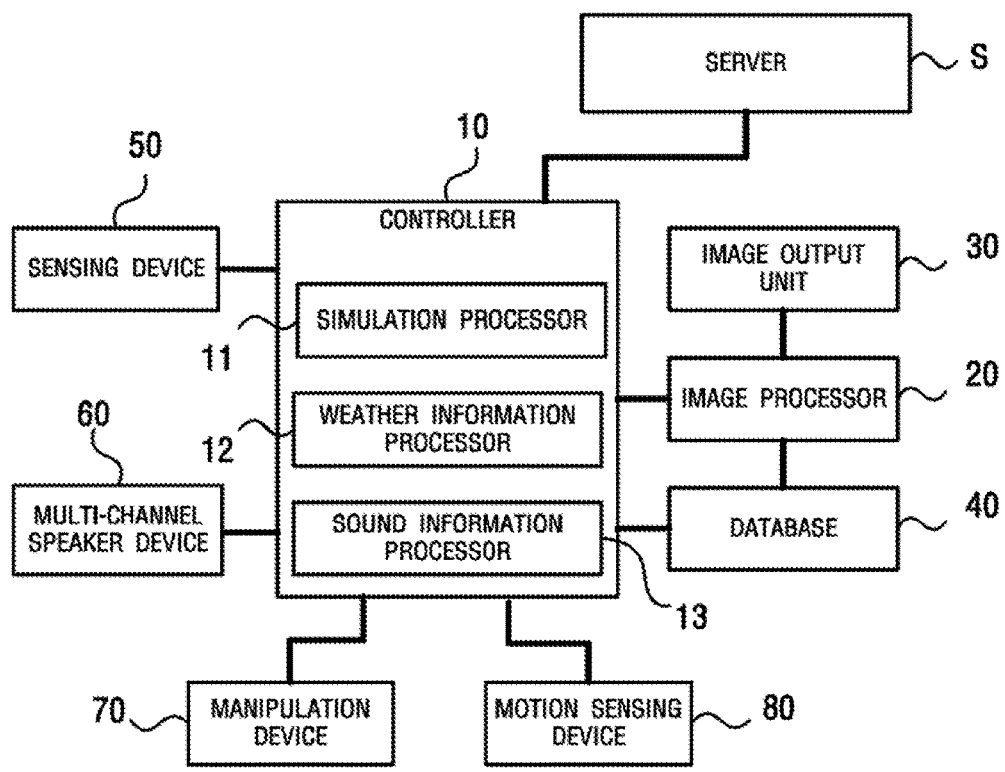

[Fig. 3]
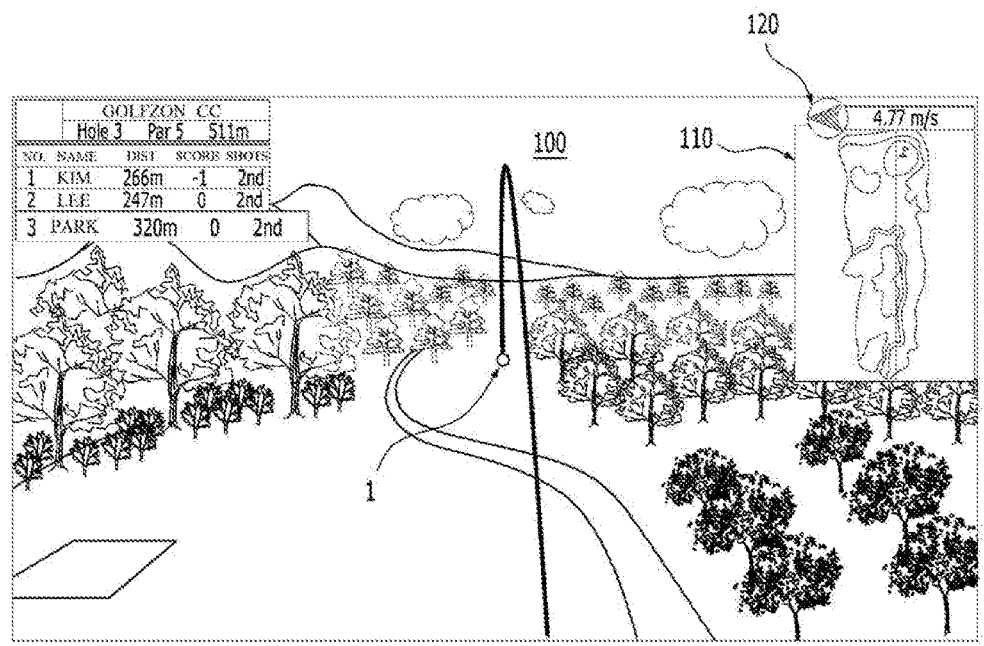

[Fig. 4]
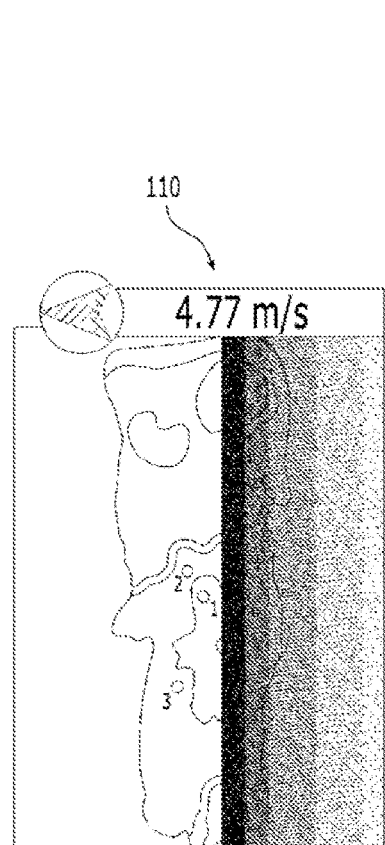
(a)
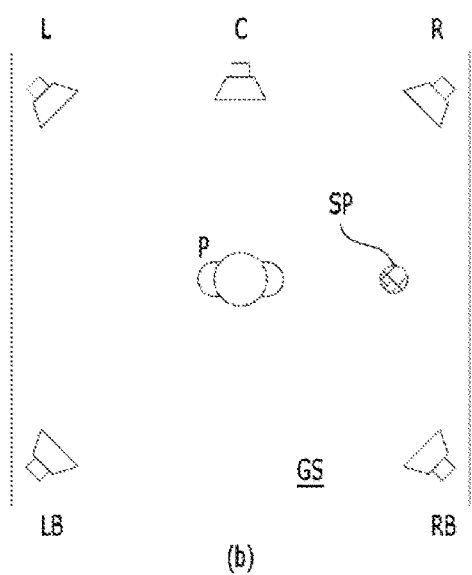
(b)
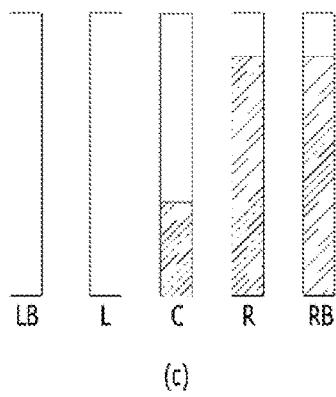
(c)

[Fig. 5]
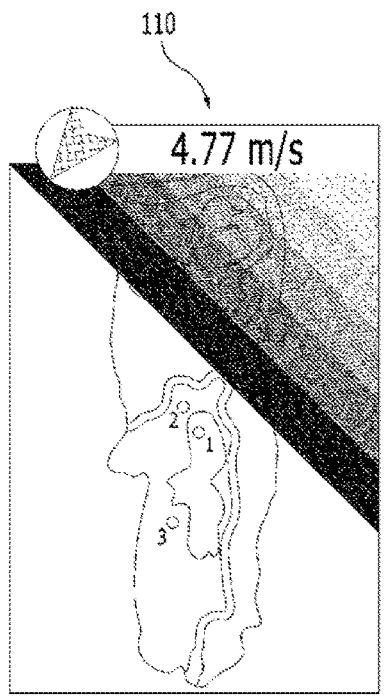
(a)
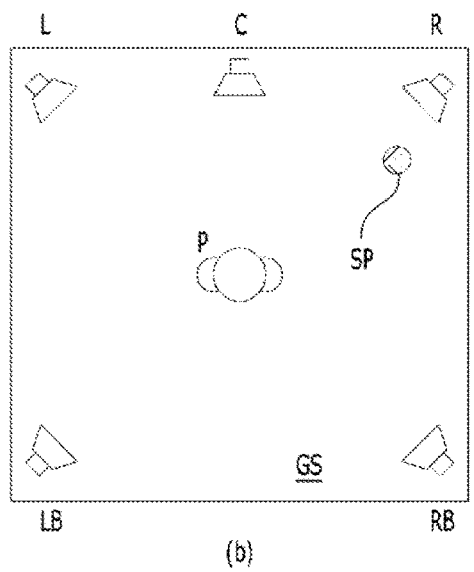
(b)
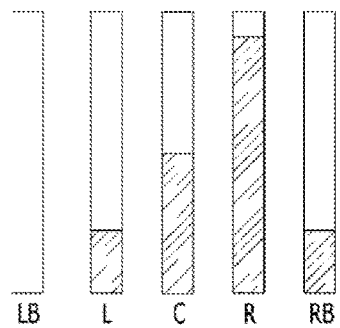
(c)

[Fig. 6]
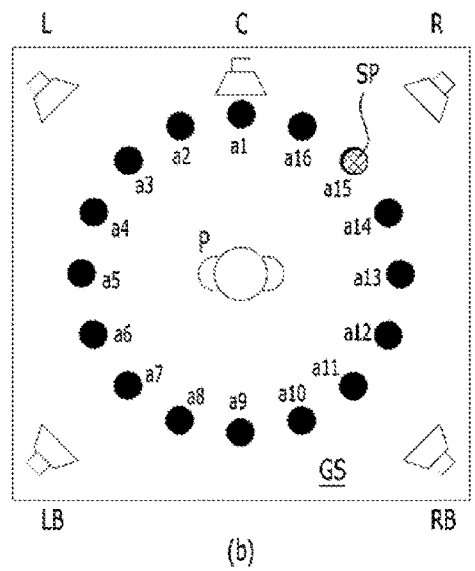
(b)
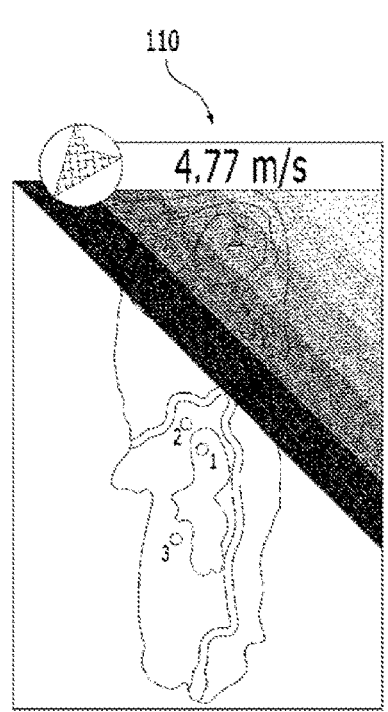
(a)
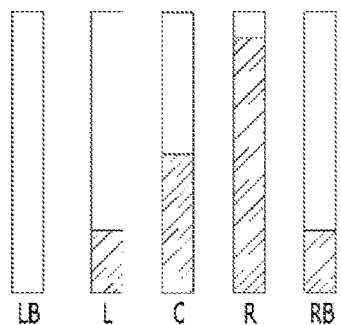
(c)

[Fig. 7]
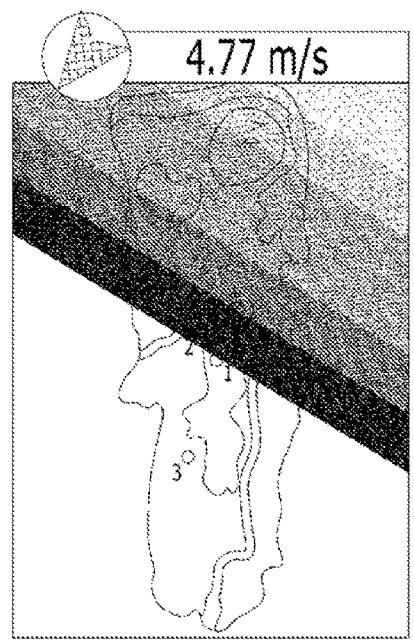
(a)
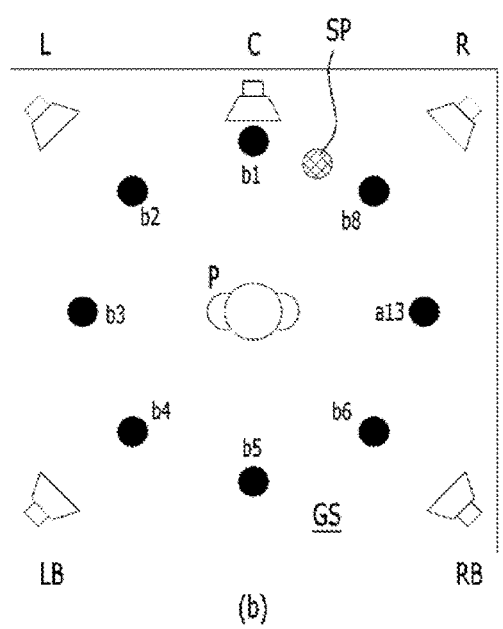
(b)

[Fig. 8]
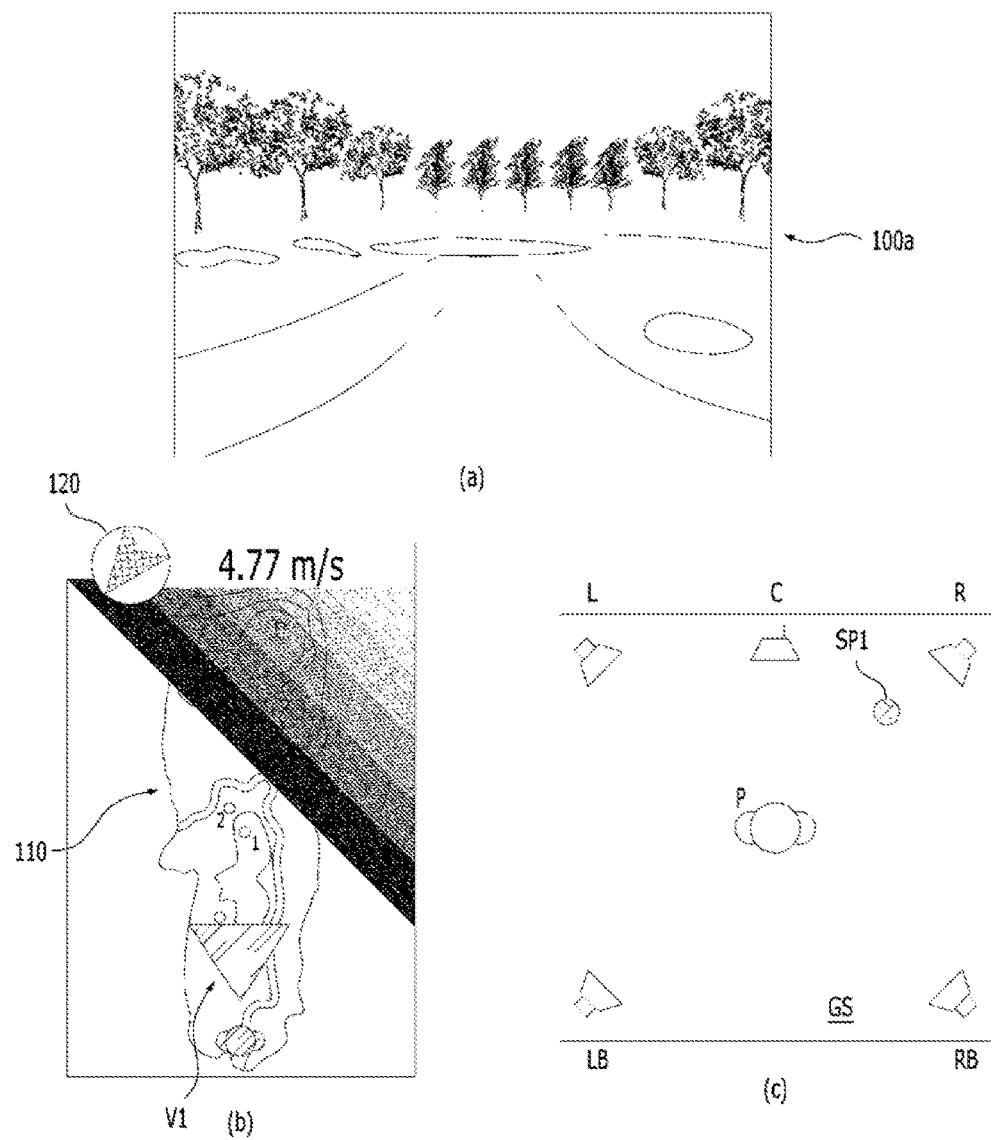

[Fig. 9]
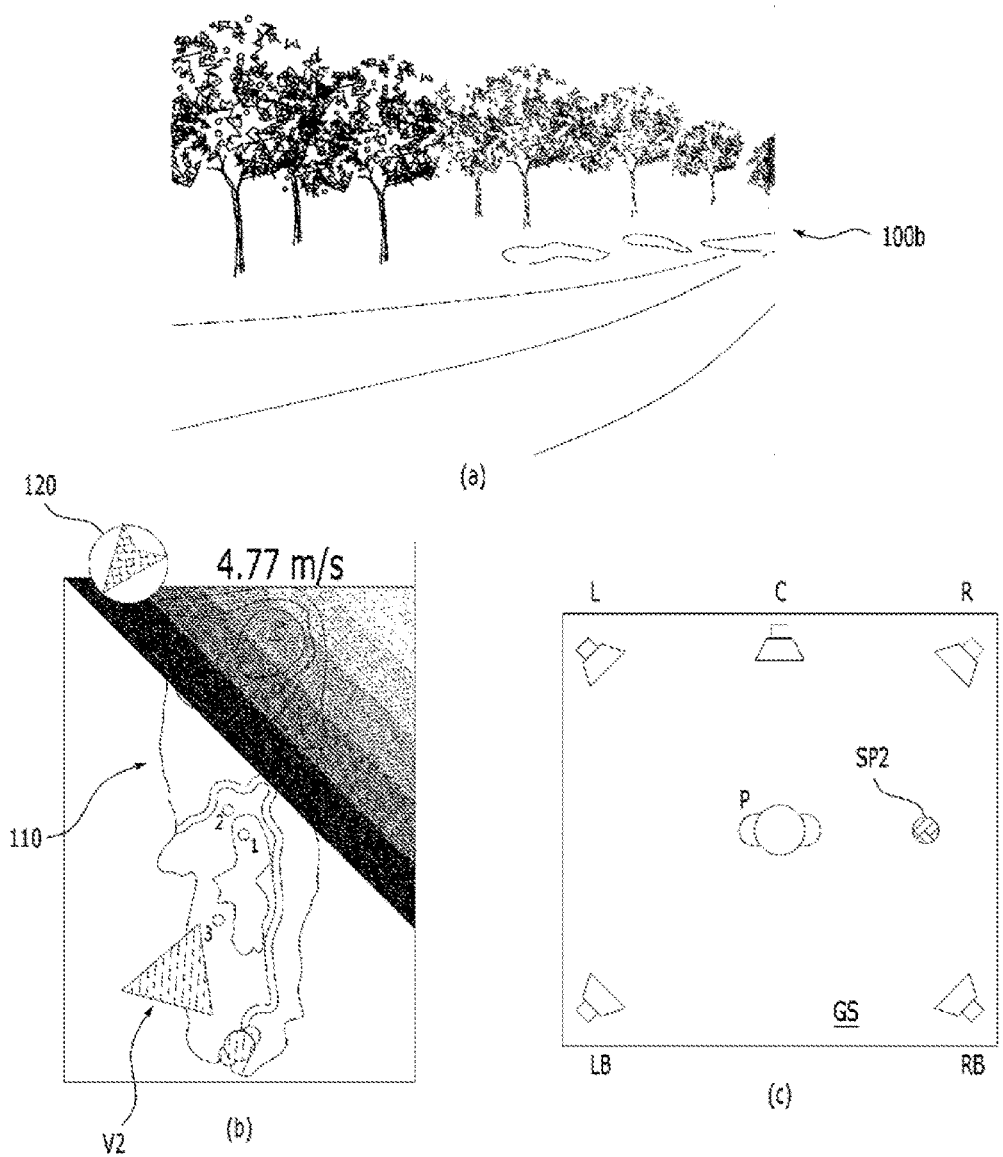

[Fig. 10]
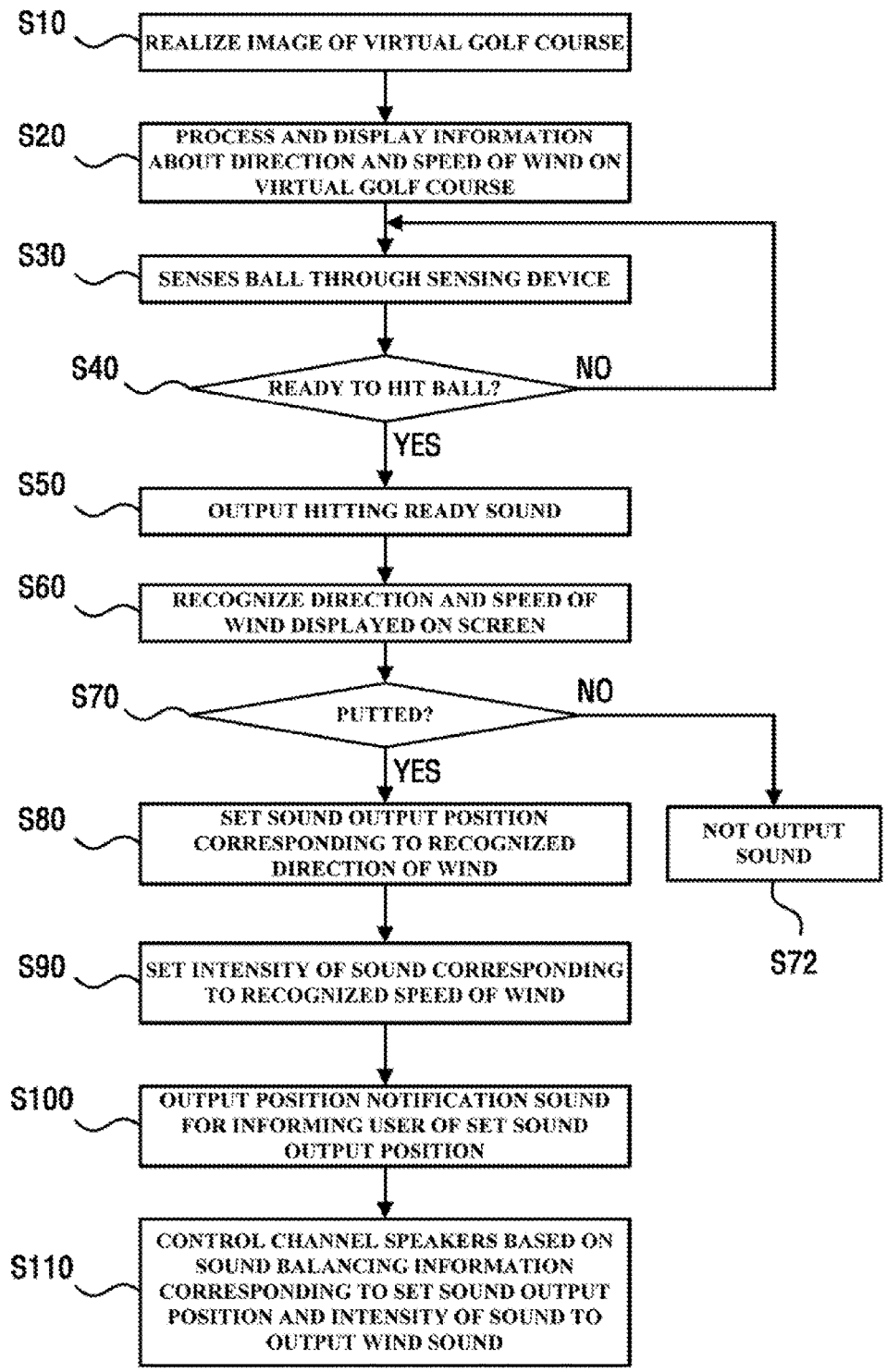

VIRTUAL GOLF SIMULATION DEVICE AND METHOD FOR PROVIDING STEREOPHONIC SOUND FOR WEATHER

CROSS REFERENCE TO PRIOR APPLICATIONS

This application is a National Stage Application of PCT International Patent Application No. PCT/KR2014/013079 filed on Dec. 30, 2014, under 35 U.S.C. § 371, which claims priority to Korean Patent Application No. 10-2013-0167611 filed on Dec. 30, 2013, which are all hereby incorporated by reference in their entirety.

TECHNICAL FIELD

The present invention relates to a virtual golf simulation device and method, and more particularly to a virtual golf simulation device and method that are capable of simulating the trajectory of a golf ball hit by a user on a virtual golf course in the state in which the virtual golf course is realized as an image such that the user plays a round of virtual golf on the virtual golf course.

BACKGROUND ART

With the recent upsurge in the golfing population, a so-called screen golf system has gained popularity, which enables a golfer to practice golf and to enjoy a virtual golf game using a virtual golf simulation device.

The screen golf system senses the velocity and direction of a golf ball that a golfer hits onto a screen installed indoors to display a virtual golf range and displays the progress of the golf ball on the screen. The screen golf system has been technically evolved in order to enable a user to feel the same realism that the user feels when playing a round of golf on a real golf course, which exceeds the level of a golf game that is simply enjoyed indoors.

Nevertheless, it is difficult for the screen golf system to provide the same sense of reality that the user would feel when the user plays a round of golf on a real golf course because the screen golf system is provided in a small indoor space. For example, weather conditions, such as wind, are very important when the user plays a round of golf on a real golf course, and the user takes a golf shot in consideration of the effect of the wind. However, the screen golf system simply provides information about the state of the wind through an image projected on a screen (which is disclosed in Korean Registered Patent No. 10-0972825). For this reason, the user does not pay much attention to the state of the wind when the user takes a golf shot.

Various techniques for providing real wind to the screen golf system have been disclosed, for example, in Korean Patent Application Publication No. 2011-0047909 (entitled SCREEN GOLF PROVIDING FIELD SENSATION (SPEED, DIRECTION, AND INTENSITY OF WIND)), Korean Patent Application Publication No. 2009-0100917 (entitled INDOOR GOLF PRACTICE DEVICE), and Korean Registered Patent No. 10-0921668 (entitled WIND SIMULATOR IN INDOOR AND SCREEN GOLF PRACTICE RANGES).

In the case in which various complex devices for generating real wind are added to the screen golf system, however, manufacturing costs may be greatly increased, which may be a burden on users, with the result that the aim of popularizing golf, which is the greatest merit of the screen golf system, may be deteriorated. In addition, the ability to add the devices for generating real wind to the screen golf system is limited because most users who enjoy the screen golf system prefer to play rounds of golf based on virtual reality in quiet and comfortable indoor spaces.

DISCLOSURE

Technical Problem

It is an object of the present invention to provide a virtual golf simulation device and method for providing stereophonic sound for weather conditions configured such that it is possible for a user to visually and aurally recognize a weather condition, such as wind, when the user plays a round of virtual golf on a virtual golf course using the virtual golf simulation device, and, in particular, the direction or intensity of the wind is expressed via multi-channel stereophonic sound, whereby it is possible to provide a high level of realism even without actually blowing air.

Technical Solution

In accordance with one aspect of the present invention, the above and other objects can be accomplished by the provision of a virtual golf simulation device including a sensing device for sensing the movement of a ball hit in a forward direction in a golf space having a predetermined size, in which a hitting zone, on which a user takes a golf swing, is provided, an image processor for processing image information so as to realize an image of a virtual golf course and an image in which the trajectory of the ball based on the sensing results is simulated on the virtual golf course, a weather information processor for processing weather information on the virtual golf course so as to realize a weather condition based on the weather information as an image through the image processor, a multi-channel speaker device including a plurality of speakers mounted in the golf space for outputting sound generated on the virtual golf course, and a sound information processor for processing sound information so as to output sound synchronized with the weather condition, realized as an image, through the multi-channel speaker device, thereby providing stereophonic sound indicating the weather condition.

In accordance with another aspect of the present invention, there is provided a virtual golf simulation method using a virtual golf simulation device for sensing the movement of a ball hit in a forward direction in a golf space having a predetermined size, in which a hitting zone, on which a user takes a golf swing, is provided, through a sensing device and simulating the trajectory of the ball based on the sensing results on a virtual golf course realized as an image, the virtual golf simulation method including processing information with respect to the state of wind on the virtual golf course so as to realize the state of the wind as an image, and processing sound information through a sound information processor so as to stereophonically output sound synchronized with the state of the wind, realized as an image, through a plurality of speakers mounted in the golf space.

Advantageous Effects

In a virtual golf simulation device and method for providing stereophonic sound indicating the state of the weather according to the present invention, it is possible for a user to visually and aurally recognize a weather condition, such as wind, when the user plays a round of virtual golf on a virtual golf course using the virtual golf simulation device. In particular, the direction or intensity of the wind is expressed via a multi-channel stereophonic sound, whereby it is possible to provide a high level of realism even without actually blowing air.

DESCRIPTION OF DRAWINGS

FIG. 1 is a view showing an example of a so-called screen golf system to which a virtual golf simulation apparatus with a virtual golf simulation device according to an embodiment of the present invention is applied;

FIG. 2 is a block diagram showing the construction of the virtual golf simulation device shown in FIG. 1;

FIG. 3 is a view showing an example of a simulation image that is realized through a sensing device 50, a control unit 10, and an image output unit 30 of the present invention;

FIGS. 4 and 5 are views illustrating the principle of providing stereophonic sound that is synchronized with the state of wind on a virtual golf course displayed in the simulation image that is realized according to the present invention;

FIGS. 6 and 7 are views illustrating embodiments for providing stereophonic sound indicating the state of wind that is realized by the virtual golf simulation device according to the present invention;

FIGS. 8 and 9 are views illustrating the provision of a stereophonic wind sound based on the change of a screen view on an image using the virtual golf simulation device according to the present invention; and FIG. 10 is a flowchart illustrating a virtual golf simulation method according to an embodiment of the present invention.

BEST MODE

Hereinafter, exemplary embodiments of a virtual golf simulation device and method for providing stereophonic sound indicating the state of the weather according to the present invention will be described in detail with reference to the accompanying drawings.

First, the construction of a virtual golf simulation device according to an embodiment of the present invention will be described with reference to FIGS. 1 and 2.

FIG. 1 is a view showing an example of a so-called screen golf system to which a virtual golf simulation apparatus with a virtual golf simulation device according to an embodiment of the present invention is applied, and FIG. 2 is a block diagram showing the construction of the virtual golf simulation device shown in FIG. 1.

As shown in FIG. 1, the virtual golf simulation device according to this embodiment of the present invention may be realized in a golf space GS having a predetermined size, in which a hitting zone HZ, on which a user P takes a golf swing, is provided. A hitting mat HM, on which a ball is placed, may be provided at one side of the hitting zone HZ.

As shown in FIGS. 1 and 2, the virtual golf simulation device according to this embodiment of the present invention may include a simulator SM, an image output unit 30, a sensing device 50, and a multi-channel speaker device 60.

As shown in FIG. 2, the simulator SM may include a controller 10, an image processor 20, and a database 40.

More specifically, the controller 10 may include a simulation processor 11, a weather information processor 12, and a sound information processor 13.

The sensing device 50 is configured to sense the movement of at least one selected from between a ball and a golf club, which is caused as the result of the user P taking a golf swing. First, the sensing device 50 senses whether a ball is placed on the hitting mat HM so as to sense whether the user is ready to hit the ball. When the user hits the ball placed on the hitting mat HM using the golf club, the sensing device 50 senses the movement of the golf club or the movement of the ball. The sensing device 50 transmits the sensing results to the controller 10.

The sensing device 50 may be configured in various forms. For example, the sensing device may be configured in the form of an infrared sensor type sensing device, which emits infrared light, receives the infrared light reflected by the head of the golf club or the ball moved as the result of the user hitting the ball, and analyzes the reflected infrared light, thereby performing sensing, a laser sensor type sensing device, which emits a laser, senses that the laser is blocked by the head of the golf club or the ball moved as the result of the user hitting the ball, and analyzes the blocked laser, thereby performing sensing, or an image sensor type sensing device, which collects images of the balls hit by the user as the result of taking the golf swing and analyzes the collected images, thereby performing sensing.

FIG. 1 shows the case in which sensing is performed by processing and analyzing images acquired using a camera unit mounted to the ceiling as an image sensor type sensing device.

Meanwhile, the controller 10 performs control such that the sensing result data received from the sensing device 50 are processed by the simulation processor 11. The simulation processor 11 processes the sensing result data to calculate information about physical properties of the ball acquired as the result of hitting the ball, thereby calculating information about the overall movement trajectory of the ball.

The image processor 20 processes information about an image of a specific virtual golf course from data related to realization of images of various virtual golf courses stored in the database 40, and transmits the processed information to the image output unit 30. In addition, the image processor 20 performs various kinds of information processing such that the movement trajectory of the ball is realized as a simulation image on the virtual golf course based on various kinds of information processed by the simulation processor 11.

The image output unit 30 outputs information of the image processed by the image processor 20 through a predetermined display unit, or projects information of the image processed by the image processor 20 on a screen F provided in front of the golf space GS. FIG. 1 shows the case in which an image 100 of the virtual golf course is projected on the screen F through the image output unit 30.

The database 40 is an element for storing all data related to virtual golf simulation. The database 40 is configured to store data for realizing an image of the trajectory of the ball as well as data for realizing an image of the virtual golf course. In addition, the database 40 is configured to store information about weather conditions on the virtual golf course or to store various kinds of data for providing stereophonic sounds, a description of which will follow.

The database 40 may be configured to store all data necessary to perform all functions of the virtual golf simulation device according to the present invention or to temporarily store data received from a server S.

Meanwhile, the weather information processor 12 of the controller 10 is an element for processing information about weather conditions on the virtual golf course realized by the image processor 20.

That is, the weather information processor 12 performs a function of extracting and processing data about weather on the virtual golf course stored in the database 40 and displaying information about the weather conditions on the virtual golf course on an image of the virtual golf course processed and realized by the image processor 20.

The weather information processor 12 may process data about weather information stored in the database 40, may process data about weather information received from the server S, or may process data about weather information received from a predetermined weather information server via the server S.

The weather information processor 12 updates weather information extracted from the database 40 or weather information received from the server S based on predetermined criteria. The weather information processor 12 may update weather information at predetermined time intervals while the user is playing a round of virtual golf on the virtual golf course, may update weather information whenever the user takes a golf shot, or may update weather information upon the completion of each hole.

The most important weather information processed by the weather information processor 12 is information about the state of wind on the virtual golf course, i.e. the direction and speed (or intensity) of wind, a detailed description of which will follow.

Meanwhile, the sound information processor 13 of the controller 10 is an element for processing sound information such that sound synchronized with the weather condition realized by the weather information processor 12 is output through the multi-channel speaker device 60 to provide stereophonic sound indicating the state of weather to the user in the golf space GS through the multi-channel speaker device 60. A description of the detailed functions of the sound information processor 13 will follow.

As shown in FIG. 1, the multi-channel speaker device 60 includes a plurality of speakers C, R, L, RB, and LB, which are mounted in the golf space GS in the state of being connected to one another.

The multi-channel speaker device 60 shown in FIG. 1 is a 5.1 channel speaker system. The left channel speaker L, the center channel speaker C, and the right channel speaker R are mounted in front of the hitting zone HZ in the state of being sequentially arranged from the left side to the right side, and the left channel rear speaker LB and the right channel rear speaker RB are mounted at the rear of the hitting zone HZ in the state of being arranged at the left side and the right side, respectively (in actuality, the left channel rear speaker LB and the right channel rear speaker RB are mounted behind the user, although the left channel rear speaker LB and the right channel rear speaker RB are shown at the left and right edges of FIG. 1 due to limitations of expression in the figure).

The multi-channel speaker device may not necessarily be a 5.1 channel speaker system. The multi-channel speaker device may be a 6.1 channel speaker system or a 7.1 channel speaker system, as alternatives to the 5.1 channel speaker system.

Meanwhile, as shown in FIG. 2, the virtual golf simulation device according to this embodiment of the present invention may further include a manipulation device 70 for allowing the user to perform manipulation, e.g. select predetermined information through the screen.

When the user plays a round of virtual golf using the virtual golf simulation device, various kinds of user manipulation, such as the selection of a virtual golf course on which a round of virtual golf it to be played, various environment settings, and taking aim during the round of virtual golf, may be required. In this case, the user may perform necessary selection or adjustment through the manipulation device 70.

An example of the manipulation device 70 may be a keyboard and a mouse, a keypad provided near the user, or a manipulation means provided on the hitting zone.

Meanwhile, as shown in FIG. 2, the virtual golf simulation device according to this embodiment of the present invention may further include a motion sensing device 80 for sensing the motion of the user.

The motion sensing device 80 is a device for performing various manipulations performed by the manipulation device through motion tracking about the motion of the user. When the user takes a specific motion, the motion sensing device 80 senses the motion of the user through motion tracking of the motion of the user, and changes a screen view based on the sensing results.

Meanwhile, FIG. 3 is a view showing an example of a simulation image 100 that is realized through the sensing device 50, thee controller 10, and the image output unit 30.

As shown in FIG. 3, the simulation image 100 includes an image in which the trajectory of a ball 1 is simulated on the virtual golf course. In this case, information about the state of wind, i.e. the direction and speed of the wind, which is processed by the weather information processor 12, is also displayed.

The information about the state of the wind may be displayed through a mini map 110, which is a reduced-size version of the virtual golf course, as shown in FIG. 3.

FIG. 3 shows the case in which an animation image of the state of the wind is realized on the mini map 110 and a wind state display unit 120 for displaying the direction and speed of the wind is displayed.

As shown in FIG. 3, the virtual golf simulation device according to this embodiment of the present invention processes sound information such that stereophonic sound synchronized with information about the state of the wind on the virtual golf course displayed on the simulation image 100 is provided to the user through the multi-channel speaker device, whereby it is possible for the user to visually and aurally feel the state of the wind on the virtual golf course on which the user is playing a round of golf.

The provision of stereophonic sound indicating the state of the wind will be described in more detail with reference to FIGS. 4 and 5.

FIG. 4 is a view illustrating the principle of providing stereophonic sound that is synchronized with the state of the wind on the virtual golf course displayed in the simulation image 100 shown in FIG. 3. FIG. 4(*a*) is a view of the mini map 110 shown in FIG. 3, FIG. 4(*b*) is a plan view schematically showing the golf space GS in which the multi-channel speaker device is mounted, and FIG. 4(*c*) is a view showing sound balancing of the respective speakers constituting the multi-channel speaker device.

Here, sound balancing means adjustment of the sound output level of the respective channel speakers such that the multi-channel speaker device outputs a desired sound.

The virtual golf simulation device according to the present invention is characterized by the provision of stereophonic sound that is synchronized with information about the state of wind on a virtual golf course that is realized as an image to the user. Based on the direction and speed of the wind displayed on the image shown in FIG. 4(*a*), the sound output position is set as shown in FIG. 4(*b*), and the sound output level of the respective channel speakers constituting the multi-channel speaker device is adjusted in accordance with sound balancing information based on the set sound output position, and then the sound is output as shown in FIG. 4(c) such that the user can hear a wind sound having an intensity corresponding to the speed of the wind in the same direction as the wind.

Here, the sound output position means a virtual position, in which the sound output level of the respective channel speakers is adjusted such that the user can recognize the virtual position as a sound source.

That is, in response to the state in which the direction of the wind on the virtual golf course, which is realized as an image, is the same as the direction from the 3 o'clock position to the 9 o'clock position as shown in FIG. 4(a), a sound output position SP is set in the direction of 3 o'clock on the basis of the user P as shown in FIG. 4(b), the sound output levels of the respective channel speakers constituting the multi-channel speaker device are adjusted based on sound balancing at the set sound output position SP, and then the sound is output (see FIG. 4(c)) such that the user can visually recognize that wind is blowing in the direction of 3 o'clock and, at the same time, can aurally recognize a wind sound in the direction of 3 o'clock.

Here, the sound balancing information may be preset at every sound output position, or may be calculated for every sound output position through a preset calculation formula or a preprogrammed algorithm.

FIG. 4(c) shows sound balancing information based on the sound output position in the direction of 3 o'clock shown in FIG. 4(b), in which the right channel speaker R and the right channel rear speaker RB each have a sound output level of 80%, the center channel speaker C has a sound output level of 40%, and the other speakers each have a sound output level of 0%.

The sound balancing information is merely an example. Sound having an intensity corresponding to the speed of the wind at the sound output position corresponding to the direction of the wind is also possible. In this case, in order to output sound having an intensity corresponding to the speed of the wind, the sound output level of the respective channel speakers may be increased or decreased in response to the speed of the wind.

Meanwhile, the stereophonic sound synchronized with the direction and speed of the wind includes only a wind sound. Alternatively, the stereophonic sound may include both a wind sound and a position notification sound, although that is not shown.

That is, after the sound output position corresponding to the direction of the wind is set and the intensity of the sound corresponding to the speed of the wind is set, as described above, a position notification sound and a wind sound based on sound balancing of the set sound output position and intensity are sequentially output at predetermined time intervals.

The position notification sound is provided to inform the user in advance of the sound output position, which is set based on the direction of the wind. The position notification sound is output before the set wind sound is output such that the user can more definitely aurally recognize the direction of the wind.

In the following embodiments, the sound output based on the sound balancing information about the sound output position may include only a predefined wind sound. Alternatively, a predefined position notification sound and a predefined wind sound may be sequentially output.

Meanwhile, another example of the case in which the state of the wind on the virtual golf course, realized as an image, is different from the state shown in FIG. 4 will be described.

FIG. 5(a) is a view showing the mini map 110, which displays information about the state of the wind, FIG. 5(b) is a plan view schematically showing the golf space GS in which the multi-channel speaker device is mounted, and FIG. 5(c) is a view showing sound balancing of the respective speakers constituting the multi-channel speaker device.

As shown in FIG. 5(a), wind is blowing in the direction of 1 o'clock on the virtual golf course, and the speed of the wind is 4.77 m/s. The sound information processor 13 (see FIG. 2) sets a sound output position corresponding to information about the direction of the wind shown in FIG. 5(a) in the direction of 1 o'clock, sets sound balancing information in consideration of the sound output position and the intensity of the sound corresponding to the speed of the wind, and controls the sound output of the respective channel speaker based on the set sound balancing information such that the user can hear a stereophonic wind sound synchronized with the image.

In the setting of the sound output position and the sound balancing information performed by the sound information processor, various situations are preset, which of the preset sound output positions corresponds to the state of the wind on the virtual golf course, which is realized as an image, is determined, and sound based on the preset sound balancing information is output from the determined sound output position such that a stereophonic wind sound can be transmitted to the user.

For example, in the state in which sound output positions are preset from position a1 to position a16 and sound balancing information is preset for each sound output position, as shown in FIG. 6(b), when wind is blowing in the direction of 1 o'clock on the virtual golf course, as shown in FIG. 6(a), the sound output position SP corresponding thereto is set to position a15, and sounds are output through the respective channel speakers based on the sound balancing information preset for the selected position a15 (the sound balancing information shown in FIG. 6(c)).

In addition, the sound balancing information for the preset positions a1 to a16 is preset for each intensity of the sound at the respective positions, and sound is output from the sound output position corresponding to the direction of the wind based on the sound balancing information corresponding to the intensity of the wind equivalent to the speed of the wind, whereby it is possible to output a wind sound corresponding to the direction and speed of the wind.

For example, on the assumption that the intensity of sounds output from the preset sound output positions a1 to a16 is categorized into a strong intensity, an intermediate intensity, and a weak intensity and that the strong intensity is preset for wind having a speed of higher than 5 m/s, the intermediate intensity is preset for wind having a speed of 2 m/s to 5 m/s, and the weak intensity is preset for wind having a speed of lower than 2 m/s, a wind sound is output from the preset sound output position a15 corresponding to the direction of the wind shown in FIG. 6(a) based on the sound balancing information corresponding to the intermediate sound equivalent to a wind speed of 4.77 m/s, among the sound balancing information categorized into the strong intensity, the intermediate intensity, and the weak intensity, whereby it is possible to provide the user with a stereophonic wind sound synchronized with the direction and intensity of the wind, realized as an image.

Of course, the intensity of the sound may not be divided into the three intensities, namely the strong intensity, the intermediate intensity, and the weak intensity, but may be divided into more than three intensities.

Meanwhile, the direction of the wind on the virtual golf course that is realized as an image may not accurately correspond to any of the preset sound output positions. For example, the sound output position corresponding to the direction of the wind on the image may be located between position a16 and position a15. In this case, the sound output position corresponding to the current direction of the wind may be set to the any one selected from between position a16 and position a15 that is closer to the sound output position.

According to another embodiment of the present invention, in the case in which the sound output position corresponding to the current direction of the wind is not correctly aligned with one preset position, i.e. the case where the sound output position corresponding to the current direction of the wind is located between two preset positions, as described above, the sound output position may not be aligned with one preset position, but sound balancing information based on the preset position adjacent to the sound output position may be corrected in order to extract sound balancing information based on the sound output position, thereby generating sound balancing information based on the sound output position, which will be described with reference to FIG. 7.

In an embodiment shown in FIG. 7, sound output positions are preset to position b1 to position b8, as shown in FIG. 7(b).

On the assumption that the sound output position corresponding to the direction of the wind on the virtual golf course as shown in FIG. 7(a) is located between the preset position b1 and the preset position b8 as shown in FIG. 7(b), sound is output based on sound balancing information based on a desired sound output position by correcting sound balancing information based on the surrounding position in order to generate sound balancing information based on the sound output position, unlike the embodiment shown in FIG. 6, in which the sound output position corresponding to the image is aligned with one preset position closer thereto.

In the embodiment shown in FIG. 6, the sound output positions are preset, and the sound output position corresponding to the direction of the wind on the image of the virtual golf course is set to one of the preset sound output positions. In the embodiment shown in FIG. 7, on the other hand, the sound output position corresponding to the direction of the wind is generated, i.e. the sound balancing information based on each preset sound output position is corrected to generate sound balancing information corresponding to the sound output position.

The former case is advantageous in the case in which the sound output positions are preset at relatively small intervals, whereas the latter case is advantageous in the case in which the sound output positions are preset at relatively large intervals.

Hereinafter, the provision of a stereophonic wind sound performed by a virtual golf simulation device according to another embodiment of the present invention will be described with reference to FIGS. 8 and 9.

The virtual golf simulation device according to this embodiment of the present invention changes a stereophonic wind sound in the case in which the view of a screen that is realized as an image is changed and provides the changed stereophonic wind sound. That is, the virtual golf simulation device according to this embodiment of the present invention is capable of, when a user's virtual environment is changed, providing a stereophonic wind sound reflecting the change in the user's virtual environment, thereby further improving the realism of virtual golf.

When the user takes a golf shot on a real golf course, it is very important for the user to take good aim, i.e. to select the direction in which the ball is to fly as the result of hitting the ball. Even in the case in which the user plays a round of virtual golf on the virtual golf course using the virtual golf simulation device, a function of taking aim is provided in consideration of the above matter.

In the case in which the user plays the round of virtual golf using the virtual golf simulation device, however, the user must take a golf shot while always looking forward because the user takes the golf shot in the golf space. For this reason, when the user takes aim, the screen view is changed in response thereto.

Additionally, in the case in which the user looks around the virtual golf course, rather than taking aim, the screen view may be changed. The screen view may be changed through the manipulation device 70 or the motion sensing device 80 described previously with reference to FIG. 2.

An example in which the user changes the screen view through the manipulation device or the motion sensing device is shown in FIGS. 8 and 9.

A screen view 100a of an image of a virtual golf course as shown in FIG. 8(a) may be a screen view corresponding to a user view V1 on the mini map 110 shown in FIG. 8(b). When the user performs the change to a screen view corresponding to a user view V2 on a mini map 110 shown in FIG. 9(b) in this state, a screen view 100b, which has been changed from the original screen view 100a, is displayed as shown in FIG. 9(a).

Even in the case in which the screen view is changed as described above, the direction of the wind on the virtual golf course is not changed. However, changing the screen view as described above means that the user changes the direction in which the user is looking forward to another direction. When the screen view is changed, therefore, the direction of the wind must be changed on the basis of the user such that the direction of the wind on the virtual golf course remains constant.

Consequently, the virtual golf simulation device according to this embodiment of the present invention changes the sound output position in response to the changed screen view, changes sound balancing such that sound based on the changed sound output position is generated in the state of the changed screen view, and outputs the sound.

An example of this case will be described with reference to FIGS. 8 and 9. The direction of the wind on the virtual golf course seen through the screen view 100a as shown in FIG. 8(a) is the direction of 1 o'clock as shown in FIG. 8(b). As a result, a sound output position SP1 is set as shown in FIG. 8(c).

When the user changes a screen view 100b as shown in FIG. 9(a), it is determined that the direction in which the user looks forward on the virtual golf course has been changed in response to the change of the screen view as shown in FIG. 9(b), and the sound output position is changed and set to a sound output position SP2 based on the new direction in which the user is looking.

In the screen view 100a shown in FIG. 8(a), for the wind in the direction of 1 o'clock as shown in FIG. 8(b), the direction of 1 o'clock, which is the same as the direction of the wind, is set as the sound output position SP1 as shown in FIG. 8(c). On the other hand, in the changed screen view 100b shown in FIG. 9(a), for the wind in the same direction of 1 o'clock on the virtual golf course as shown in FIG. 9(b), the setting is changed to the sound output position SP2 in the direction of 3 o'clock in consideration of the change of the direction in which the user looks forward as shown in FIG. 9(c).

Consequently, the virtual golf simulation device according to the present invention is capable of, when the user changes the screen view by taking aim, changing the sound output position in response to the change of the screen view such that the direction of the wind on the virtual golf course remains constant, thereby further improving reality in the virtual golf environment.

Meanwhile, in the respective embodiments previously described with reference to FIGS. 4 to 9, information about the state of the wind may be changed based on criteria preset by the weather information processor 12 (see FIG. 2), and, when the state of the wind is changed and information about the changed state of the wind is displayed on the screen, the sound information processor 13 (see FIG. 2) generates stereophonic sound based on the changed state of the wind.

The weather information processor updates information about the state of the wind extracted from the database (i.e. information about the direction and speed of the wind) or information about the state of the wind received from the server based on predetermined criteria. The weather information processor 12 may update information about the state of the wind at predetermined time intervals while the user is playing a round of virtual golf on the virtual golf course, may update information about the state of the wind whenever the user takes a golf shot, or may update information about the state of the wind upon the completion of each hole.

When information about the state of the wind is updated as described above, the sound information processor generates stereophonic sound indicating the updated state of the wind.

Hereinafter, a virtual golf simulation method according to an embodiment of the present invention will be described with reference to a flowchart shown in FIG. 10. FIG. 10 is a flowchart illustrating a virtual golf simulation method using the virtual golf simulation device having the construction shown in FIGS. 1 and 2.

When a virtual golf game using the virtual golf simulation device is started, the controller extracts information about a virtual golf course, selected by the user from the database, or receives such information from the server such that an image of the virtual golf course is realized by the image processor and the image output unit (S10).

At this time, the weather information processor processes information about the direction and speed of the wind on the virtual golf course, which has been extracted from the database or received from the server, to display information about the direction and speed of the wind on an image of the virtual golf course (S20). For example, the information about the direction and speed of the wind may be displayed through the mini map shown in FIG. 3.

The user places a ball on the hitting mat in order to take a golf shot on the hitting zone while viewing the virtual golf course realized as the image.

At this time, the sensing device senses the ball placed on the hitting mat to determine whether the user is ready to hit the ball (S30). For example, when the ball placed on the hitting mat does not move for a predetermined time, the sensing device may determine that the user is ready to hit the ball.

When the user is ready to hit the ball (S40), the controller outputs a hitting ready sound, including any one selected from between a voice or sound for informing the user that the user is ready to hit the ball, through the multi-channel speaker device (S50). For example, an utterance of "ready" may be output as the hitting ready sound.

At this time, the sound information processor recognizes the direction and speed of the wind displayed on the screen (S60), and sets a sound output position corresponding to the recognized direction of the wind (S80). The setting of the sound output position has already been described in detail with reference to FIGS. 4 to 9, and therefore a description thereof will be omitted.

In the case in which the user putts on a green of the virtual golf course realized as the image (S70), it is preferable not to output a wind sound (S72). This is because putting is little affected by the wind, and therefore it is an interference to provide a wind sound to the user.

Meanwhile, when the sound output position corresponding to the direction of the wind on the image is set as described above, the intensity of the sound corresponding to the speed of the wind on the image is set (S90).

A position notification sound for informing the user of the set sound output position is output (S100). Subsequently, the respective channel speakers are controlled based on sound balancing information corresponding to the set sound output position and the set intensity of the sound such that a wind sound is output through the respective channel speakers (S110).

At this time, the hitting ready sound and the position notification sound may be output simultaneously. Alternatively, the hitting ready sound and the position notification sound may be output sequentially at predetermined time intervals. Preferably, the wind sound is output after the hitting ready sound and the position notification sound, which are output simultaneously or sequentially.

As the result of outputting the wind sound, the user may visually and aurally recognize the direction and intensity of the wind, and may take a better golf shot in consideration of the effect of the wind.

[Mode for Invention]

Various embodiments for carrying out the invention have been described in the best mode for carrying out the invention.

INDUSTRIAL APPLICABILITY

A virtual golf simulation device and method for providing stereophonic sound indicating the state of the weather according to the present invention are applicable to industries related to golf practice, in which a user may enjoy a round of virtual golf through golf simulation based on virtual reality.

The invention claimed is:

1. A virtual golf simulation device comprising:
a sensor for sensing a movement of a ball hit in a forward direction in a golf space having a predetermined size, in which a hitting zone, on which a user takes a golf swing, is provided;
an image processor for processing image information so as to realize an image of a virtual golf course and an image in which a trajectory of the ball based on the sensing results is simulated on the virtual golf course;
a weather information processor for processing weather information on the virtual golf course so as to realize a weather condition based on the weather information as an image through the image processor,
wherein the weather information processor sets a direction of the wind on the virtual golf course, and realizes an image of a state of the wind based on the set direction of the wind on the virtual golf course;
a multi-channel speaker device comprising a plurality of speakers mounted in the golf space for outputting sound generated on the virtual golf course; and
a sound information processor for processing sound information so as to output sound synchronized with the weather condition through the multi-channel speaker device, thereby providing stereophonic sound indicating the weather condition,
wherein the sound information processor sets a sound output position, which the user recognizes as a sound source, so as to correspond to the direction of the wind based on the state of wind realized as the image, and controls sound balancing of the speakers such that sound is generated from the set sound output position.

2. The virtual golf simulation device according to claim 1, wherein the weather condition based on the weather information comprises a first weather condition for a speed of the wind, which may be categorized into a plurality of speeds, and a second weather condition for an intensity of the wind, which may be categorized into a plurality of intensities.

3. The virtual golf simulation device according to claim 1, wherein
the weather information processor sets a direction of the wind on the virtual golf course, and realizes an image of a state of the wind based on the set direction of the wind on the virtual golf course, and
the sound information processor presets a plurality of sound output positions each of which the user recognizes as a sound source,
wherein the sound information processor presets information with respect to sound balancing of the speakers per each of the preset sound output position so that sound corresponding to each of the preset sound output position is generated, and
wherein the sound information processor selects one of the preset sound output positions corresponding to the direction of the wind based on the state of wind realized as the image such that the preset sound is generated from the selected sound output position.

4. The virtual golf simulation device according to claim 1, wherein
the weather information processor sets a direction of the wind on the virtual golf course, and realizes an image of a state of the wind based on the set direction of the wind on the virtual golf course, and
the sound information processor presets a plurality of sound output positions each of which the user recognizes as a sound source,
wherein the sound information processor presets information with respect to sound balancing of the speakers per each of the preset sound output position so that sound corresponding to each of the preset sound output position is generated,
wherein the sound information processor determines a sound output position corresponding to the direction of the wind based on the state of wind realized as the image, and corrects the preset information with respect to the sound balancing so as to correspond to the determined sound output position.

5. The virtual golf simulation device according to claim 1, wherein
the weather information processor determines a speed of the wind on the virtual golf course, and realizes an image of the state of the wind based on the determined speed of the wind on the virtual golf course, and
the sound information processor determines an intensity of the sound corresponding to the speed of the wind based on the state of wind realized as the image, and controls an output of the sound from the multi-channel speaker device based on the determined intensity of the sound.

6. The virtual golf simulation device according to claim 1, wherein
the weather information processor determines a direction and speed of the wind on the virtual golf course, and realizes an image of a state of the wind based on the determined direction and speed of the wind on the virtual golf course, and
the sound information processor presets a plurality of sound output positions each of which the user recognizes as a sound source,
wherein the sound information processor presets information with respect to sound balancing of the speakers for an intensity of the sound to be categorized into a plurality of intensities per each of the preset sound output position so that sound corresponding to each of the preset sound output position is generated,
wherein the sound information processor selects one of the preset sound output positions corresponding to the direction of the wind based on the state of wind realized as the image, and selects the information with respect to the sound balancing of the intensity of the sound corresponding to the speed of the wind based on the state of wind realized as the image from among the information with respect to the sound balancing per intensity of the sound for the selected sound output position such that the sound is generated based on the selected information with respect to the sound balancing.

7. The virtual golf simulation device according to claim 1, wherein
the weather information processor determines a direction of the wind on the virtual golf course, and realizes an image of a state of the wind based on the set direction of the wind on the virtual golf course, and
the sound information processor sequentially outputs a position notification sound for informing the user of a sound output position corresponding to the determined direction of the wind and a wind sound based on the sound output position at predetermined time intervals.

8. The virtual golf simulation device according to claim 1, further comprising:
a device for allowing the user to change a screen view of the image realized by the image processor, wherein
the sound information processor changes the sound output position in response to the screen view changed through the device for allowing the user to change the screen view, and controls sound balancing of the speakers such that sound is generated from the changed sound output position in a state of the changed screen view.

9. The virtual golf simulation device according to claim 1, wherein
the image processor is configured to display an image of a mini map, which is a reduced-size version of the virtual golf course, on one side of a screen,
the weather information processor is configured to display information with respect to a state of the wind on the mini map, and
the sound information processor is configured to output sound synchronized with the information with respect to the state of the wind displayed on the mini map through the multi-channel speaker device.

10. A computer-implemented virtual golf simulation method using a virtual golf simulation device for sensing a movement of a ball hit in a forward direction in a golf space having a predetermined size, in which a hitting zone, on which a user takes a golf swing, is provided, through sensor and simulating a trajectory of the ball based on the sensing results on a virtual golf course realized as an image, the virtual golf simulation method comprising:

processing, by a weather information processor, information with respect to a state of wind on the virtual golf course so as to realize the state of the wind as an image; and processing, by a sound information processor, sound information through a sound information processor so as to stereophonically output sound synchronized with the state of the wind through a plurality of speakers mounted in the golf space, wherein the state of the wind is realized as the image, wherein the step of processing the sound information comprises:

setting a sound output position, which the user recognizes as a sound source, so as to correspond to the direction of the wind based on the state of wind realized as the image; and controlling sound balancing of the speakers such that sound is generated from the set sound output position.

11. The virtual golf simulation method according to claim 10, wherein the sound information processor presets a plurality of sound output positions, which the user recognizes as a sound source, and presets information with respect to sound balancing of the speakers such that sound is generated from the preset sound output positions, and the step of processing the sound information comprises:

selecting one of the preset sound output positions corresponding to the direction of the wind based on the state of wind realized as the image; and controlling at least one of the speakers based on information with respect to sound balancing preset for the selected sound output position.

12. The virtual golf simulation method according to claim 10, wherein the sound information processor presets a plurality of sound output positions each of which the user recognizes as a sound source, and presets information with respect to sound balancing of the speakers per each of the preset sound output position so that sound corresponding to each of the preset sound output position is generated, and the step of processing the sound information comprises:

setting a sound output position corresponding to the direction of the wind based on the state of wind realized as the image;

correcting the preset information with respect to the sound balancing so as to correspond to the set sound output position; and controlling at least one of the speakers based on the corrected information with respect to the sound balancing.

13. The virtual golf simulation method according to claim 10, wherein the step of processing the sound information comprises:

setting an intensity of the sound corresponding to a speed of the wind based on the state of wind realized as the image; and controlling at least one of the speakers based on the set intensity of the sound.

14. The virtual golf simulation method according to claim 10, wherein the step of processing the sound information comprises:

setting a sound output position corresponding to the direction of the wind based on the state of wind realized as the image;

outputting a predetermined position notification sound for informing the user of the set sound output position; and outputting a wind sound preset based on the sound output position.

15. The virtual golf simulation method according to claim 14, further comprising:

determining whether the user is ready to hit the ball by sensing the ball placed on the hitting zone through the sensor before the user hit the ball on the hitting zone, wherein the step of processing the sound information comprises outputting a hitting ready sound, comprising any one selected from between a voice or sound for informing the user that the user is ready to hit the ball upon determining that the user is ready to hit the ball through the sensor.

16. The virtual golf simulation method according to claim 10, wherein the sound synchronized with the state of the wind realized as the image at the step of processing the sound information comprises a preset wind sound preset generated from a sound output position corresponding to the direction of the wind based on the state of wind realized as the image, and the sound output position is set based on a direction of the user who directly looks at the virtual golf course displayed on a screen view of the image.

17. The virtual golf simulation method according to claim 16, wherein the virtual golf simulation device further comprises a device for allowing the user to change the screen view of the image, and the step of processing the sound information comprises:

sensing whether the screen view of the image has been changed by the user;

setting the sound output position based on the direction of the user changed in response to the change of the screen view; and controlling sound balancing of the speakers such that the wind sound is generated from the sound output position set based on the changed direction of the user.

18. The virtual golf simulation method according to claim 10, wherein the step of realizing the state of the wind as the image comprises: displaying an image of a mini map, which is a reduced-size version of the virtual golf course, on one side of a screen;

and displaying information about the state of the wind on the mini map, and the step of processing the sound information comprises processing the sound information such that sound synchronized with the information about the state of the wind displayed on the mini map is output.

* * * * *